United States Patent [19]

Shin

[11] Patent Number: 5,558,361
[45] Date of Patent: Sep. 24, 1996

[54] SUSPENSION SYSTEM FOR FRONT WHEELS OF A LOW-BODY BUS

[75] Inventor: Dong W. Shin, Ulsan-si, Rep. of Korea

[73] Assignee: Hyundai Motor Company, Seoul, Rep. of Korea

[21] Appl. No.: 318,437

[22] Filed: Oct. 5, 1994

[51] Int. Cl.$^6$ .................................................. B60G 3/06
[52] U.S. Cl. ........................ 280/697; 280/692; 267/259
[58] Field of Search ...................................... 280/690, 691, 280/692, 695, 697, 700, 710, 712, 721, 693, 698; 267/276, 220, 256, 259, 285

[56] References Cited

U.S. PATENT DOCUMENTS

| | | | |
|---|---|---|---|
| 3,033,587 | 5/1962 | Perish | 280/695 X |
| 3,598,385 | 8/1971 | Parsons, Jr. | 280/692 X |
| 4,327,927 | 5/1982 | Tanaka et al. | 280/695 X |
| 4,515,390 | 5/1985 | Greenberg | 280/675 |
| 4,854,603 | 8/1989 | Scaduto | 280/675 X |
| 5,411,285 | 5/1995 | Lee | 280/710 X |

FOREIGN PATENT DOCUMENTS 3-231010  10/1991  Japan ................................. 280/673

*Primary Examiner*—Lee Young
*Attorney, Agent, or Firm*—Birch, Stewart, Kolasch & Birch, LLP

[57] ABSTRACT

A suspension system for front wheels of a low-body bus includes a frame and a wheel carrier. A shock absorber, a strut bar, and a torsion bar are also provided, all of which are disposed horizontally and below a floor of the vehicle body enable positioning of the floor at a low position and allow a wider floor area.

11 Claims, 3 Drawing Sheets

SUSPENSION SYSTEM FOR FRONT WHEELS OF A LOW-BODY BUS

BACKGROUND OF THE INVENTION

1. Field of the Invention

This invention relates to a suspension system for front wheels of a low-body bus such as a long-distance bus or a city bus and, more particularly to a suspension system which can lower floor height and widen a width of the vehicle floor.

2. Description of the Prior Art

Since the function of the front wheels is different from that of the rear wheels, the type of suspension system applied to the former is different from the latter.

Generally, a rigid axle type of suspension is applied to front wheels of a commercial vehicle. However, in order to improve ride comfort and steering stability, an independent type of suspension is often applied to a commercial vehicle.

Since a conventional independent type of suspension has a vertical shock absorber to absorb impacts or vibrations from the front wheels, there is a limit to the floor height.

FIG. 3 shows a conventional independent type of suspension system for a commercial vehicle, which includes a pair of air springs 52 for supporting a vehicle body 50, a pair of supports 54 for supporting the air springs 52 respectively, a wheel carrier 58 rotatably mounted on a wheel for connecting the wheel 60 to the support 54, a pair of shock absorbers 62 connected to the inside of each support 54, a pair of upper arms 66 for connecting an upper portion of each of the supports 54 to a side frame 68, and a pair of lower arms 56 connected to a center frame 70.

In these kinds of suspension systems, when impact and the vibration occurs, the front wheel 60 vibrates about hinge points P1 and P2, a connection point of the side frame 68 and the upper arm 66 and that of the center frame 70 and the lower arm 56, respectively. At this time, the air springs 52 and the shock absorbers 62 dampen the impact and reduce the vibration.

However, since this kind of suspension includes the vertical support 54, an air spring 52 on the support 54, and a vertical shock absorber 62, a floor 64 on these suspension elements are disposed high from the ground.

Further, since the floor 64 is disposed inside the air springs 52, the width of the floor 64 is limited.

The floor 64 is preferred to be disposed at a low position close to the ground and to be wide for the sake of convenience.

SUMMARY OF THE INVENTION

It is an object of the present invention to provide a suspension system for front wheels of low-body bus which can enable the floor to be positioned lower in order to facilitate getting on and off the bus and a wider floor for the sake of convenience.

In order to accomplish the above object, the present invention provides a suspension system for a low-body bus comprising a shock absorber horizontally disposed on a lower portion of a vehicle body, a pair of control arms each having one end connected to one end of the shock absorber and the other end connected to a wheel carrier, a torsion bar connected to a middle portion of the control arm, and a strut bar for limiting front and rear direction movement of said elements.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
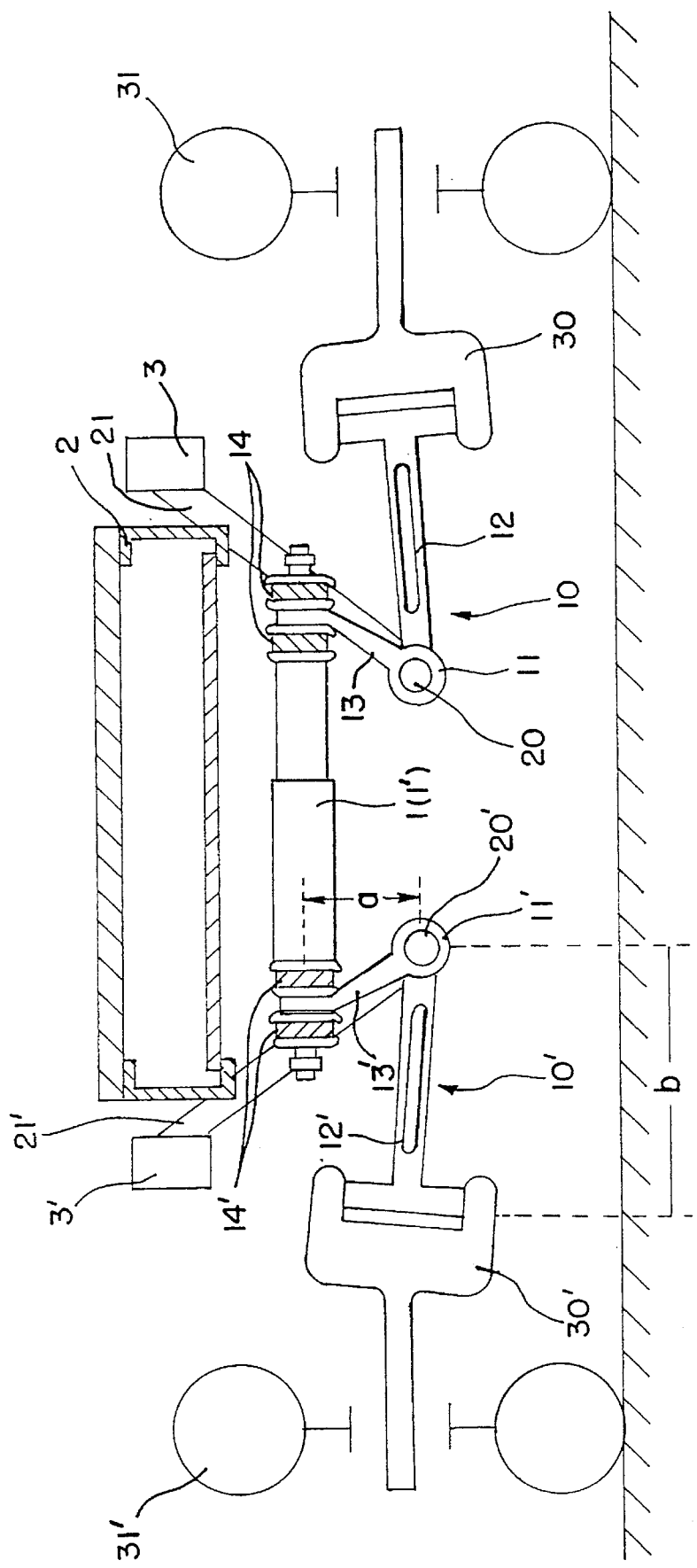
FIG. 1 is an elevational view of a suspension system for front wheels of a low-body bus according to the present invention.
Figure 2:
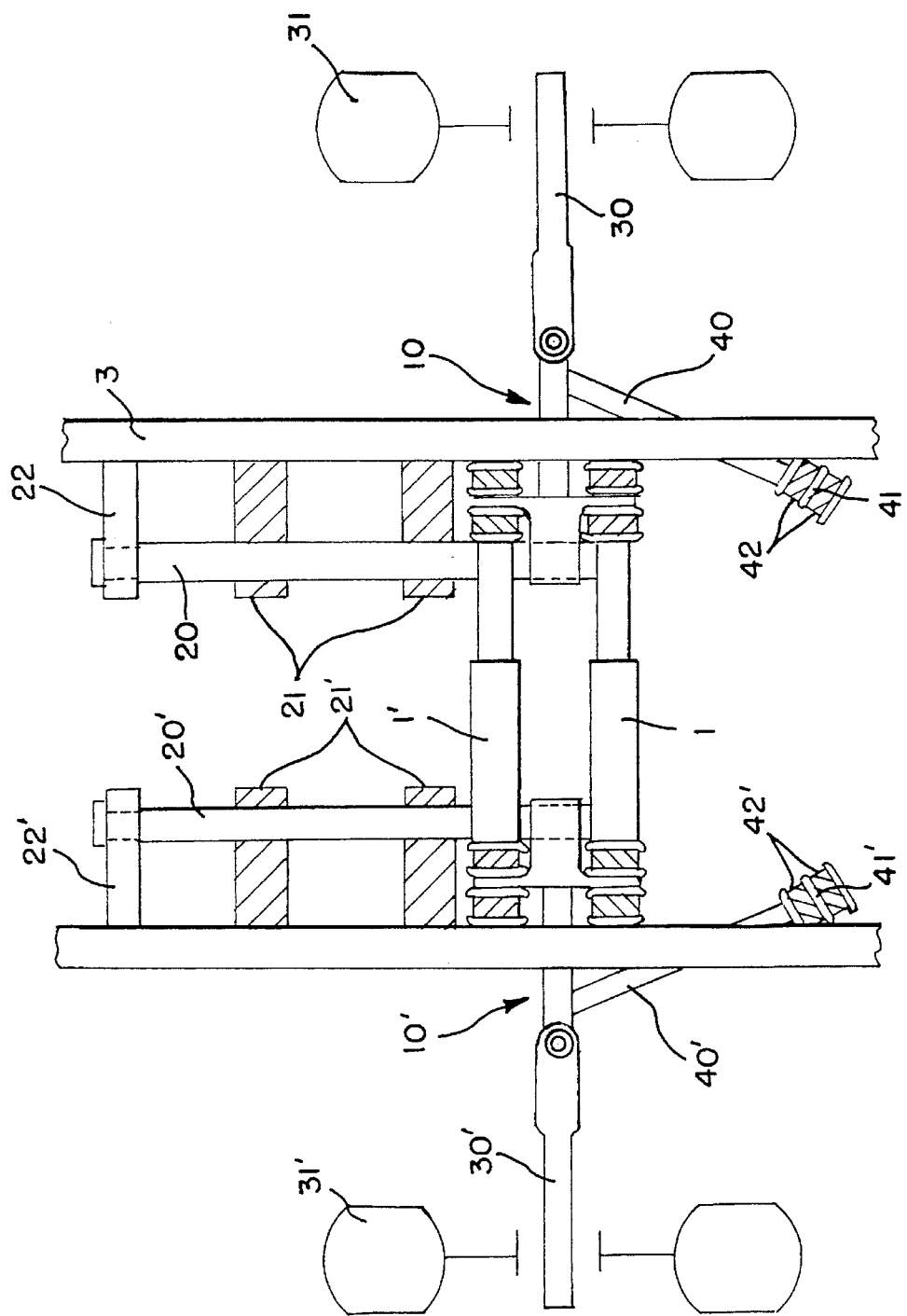
FIG. 2 is a plan view thereof.
Figure 3:
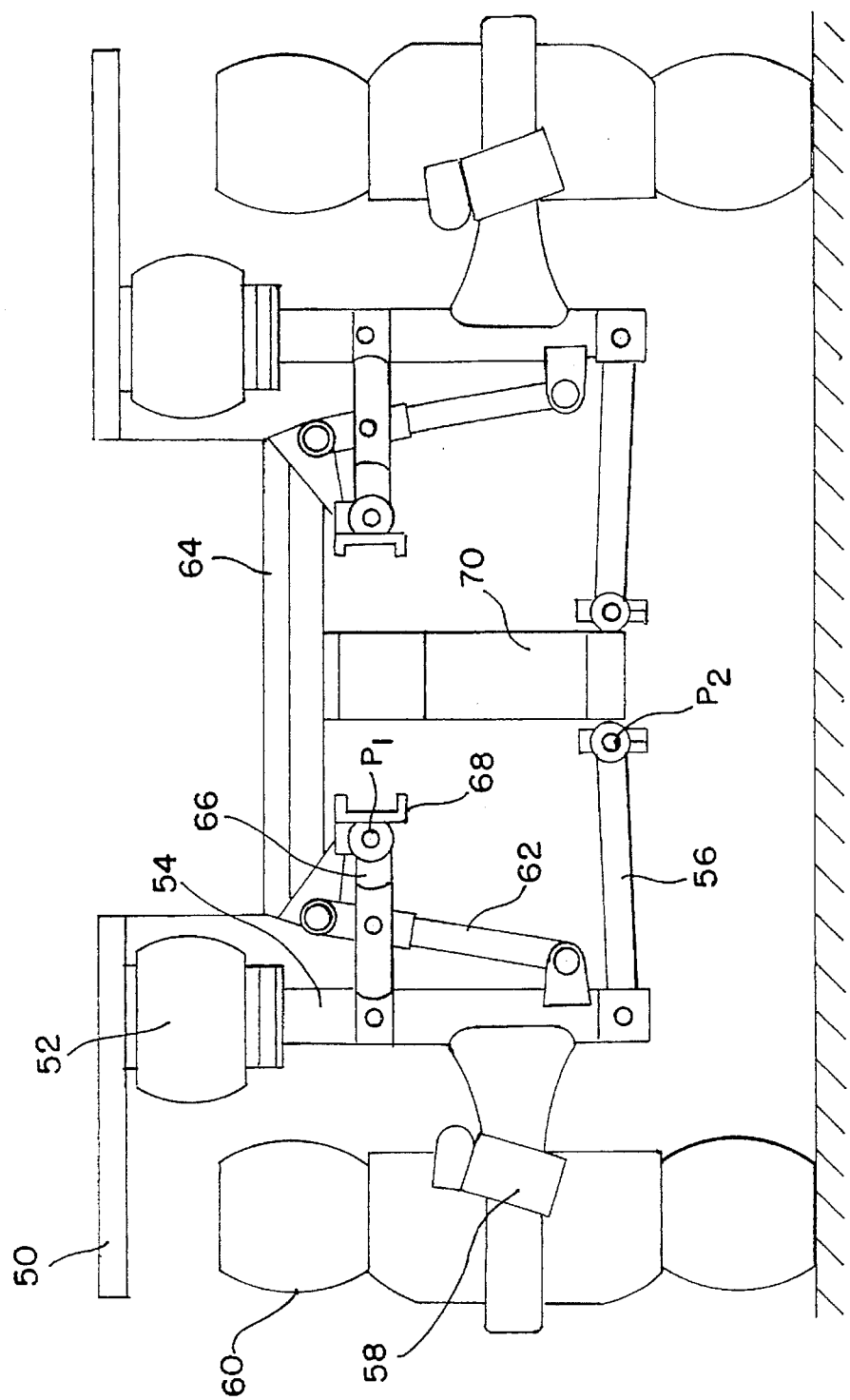
FIG. 3 is an elevational view of a conventional suspension system for front wheels of a low-body bus.

FIGS. 1 and 2 are elevational and plan views, respectively, of the suspension system according to the present invention, wherein reference numerals 1 and 1' designate shock absorbers which are disposed apart from each other by a predetermined distance between two frames 3 and 3' disposed in the longitudinal direction of the vehicle body 2, at the lower portion of the vehicle body 2.

That is, the shock absorbers 1 and 1' of conventional construction lie in the transverse direction of the vehicle body 2. The number of the shock absorbers 1 and 1' can be one or two. The shock absorbers 1 and 1' connect a pair of L-shaped control arms 10 and 10' to each other.

The L-shaped control arms 10 and 10' consist of vertical portions 13 and 13', horizontal portions 12 and 12', and bosses 11 and 11', respectively The upper portions of the vertical portions 13 and 13' are connected to each end of the shock absorbers 1 and 1', respectively. Thus, when the number of the shock absorbers is two, the vertical portions 13 and 13' diverge to be connected to the shock absorbers 1 and 1'. The connecting means are screws and at the both sides of the upper ends of the vertical portions 13 and 13' lie elastic members 14 and 14'. The elastic members 14 and 14' are preferred to be rubber washers which have high elasticities.

An up-down movement of the wheels 31 and 31' push the shock absorbers 1 and 1' horizontally. This particularly occurs when the first vibrations of the vehicle body or pitch and bounce occur, since a speed of a piston of each of the shock absorbers 1 and 1' becomes twice as much as that in normal state, the dampening effect increases. Also, when a vibration like a shock occurs in which only one wheel moves, a hard or harsh feeling is improved due to a dampening effect of the shock absorbers 1 and 1'.

One end of each of a pair of torsion bars 20 and 20' is fixed into the bosses 11 and 11' of the control arms 10 and 10' in order to rotate in accordance with the movement of the control arms 10 and 10'. The torsion bars 20 and 20' are supported by holders 21 and 21' extended from the frames 3 and 3', respectively The torsion bars 20 and 20' penetrate through holes of the holders 21 and 21' and the other ends of the torsion bars 20 and 20' are fixed to a pair of members 22 extended from the frames 3 and 3', respectively When the control arms 10 and 10' rotate due to the up-down movements of the wheels 31 and 31', respectively, the torsion bars 20 and 20' are twisted and act as springs.

The horizontal portions 12 and 12' of the control arms 10 and 10' are articulated to the wheel carriers 30 and 30' which rotatably support wheels 31 and 31', in order to steer wheels 31 and 31'. The wheel carriers 30 and 30' have a steering system, which is conventional.

When the wheels 31 and 31' experience vibration and impact resulting from the road conditions, the up-down movements of the wheels 31 and 31' make the control arms 10 and 10' rotate about the boss portions 11 and 11' of the control arms 10 and 10', respectively. At this time, the torsion bars 20 and 20' absorb the torsional vibration and also the shock absorbers 1 and 1' dampen the vibration transmitted to the control arms 10 and 10'.

The degrees of compressing the shock absorbers 1 and 1' of the control arms 10 and 10' are determined by the ratio between the lengths a and b of the vertical and horizontal portions of the control arms 10 and 10', respectively. The ratio can be determined by the characteristic of the bus. When the horizontal portions 12 and 12' are longer than the vertical portions 13 and 13' respectively, the movements of the vertical portions 13 and 13' are smaller than that of the horizontal portions 12 and 12', respectively. Thus, the horizontal portions 12 and 12' are preferred to be longer than the vertical portions 13 and 13', respectively.

The rear ends of strut bars 40 and 40' for absorbing front and rear vibrations from the wheels 31 and 31' are connected to the outer ends of the horizontal portions 12 and 12' of the control arms 10 and 10', respectively. Also, the rear ends of the strut bars 40 and 40' can be connected to the wheel carriers 30 and 30' or to the connecting portions of the horizontal portions 12 and 12' and the wheel carrier 30 and 30', respectively. The front ends of the strut bars 40 and 40' are connected to brackets 41 and 41' of the frames 3 and 3', respectively As can be seen in FIG. 2, the strut bars 40 and 40' are inclined toward the inner side of the frames 3 and 3'. Elastic members 42 and 42', for example rubber washers, are inserted between the rear ends of the strut bars 40 and 40' and the brackets 41 and 41', respectively, and absorb the vibrations The conventional suspension system for front wheels of a low-body bus lies between the wheel and vehicle body and has a vertical shock absorber. On the other hand, as described above, the present invention provides a suspension system for front wheels of a low-body bus which comprises the shock absorbers 1 and 1' disposed horizontally and transverse to a longitudinal direction of the vehicle body 2, and the torsion bars 20 and 20' disposed horizontally in the longitudinal direction of the vehicle body. Further, the whole suspension system lies below the vehicle body 2. Therefore, the height of the floor of the bus according to the present invention can be lower than that according to the conventional suspension system and the width of the floor is wider in order to facilitate getting on and off the bus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension system for a low-body bus comprising:

a pair of frame members positioned parallel to a longitudinal axis of and coplanar with a lower portion of a vehicle body;

a pair of wheel carriers, each wheel carrier rotatably connected to a respective one of a pair of front wheels and positioned below the vehicle body;

at least one shock absorber disposed horizontally below the vehicle body and transversely positioned with respect to the longitudinal axis of the vehicle body;

a pair of control arms, each control arm having a vertical portion directly connected to said at least one shock absorber, a horizontal portion directly connected to a respective one of said pair of wheel carriers, and a middle portion where the horizontal portion and the vertical portion pivotally connect, said pair of control arms being entirely positioned below said vehicle body; and a pair of torsion bars, each torsion bar having one end connected to the middle portion of a respective one of said pair of control arms and the other end connected to a respective one of said frame members wherein said pair of torsion bars are entirely positioned below the vehicle body.

2. The suspension system for a low-body bus according to claim 1, further comprising a pair of strut bars, each strut bar having one end connected to a corresponding one of said pair of frame members and the other end connected to a corresponding one of said pair of wheel carriers.

3. The suspension system for a low-body bus according to claim 1, further comprising a pair of strut bars, each strut bar having one end connected to a corresponding one of said pair of frame members and the other end connected to a connecting portion of a corresponding one of said pair of control arms and a corresponding one of said pair of wheel carriers.

4. The suspension system for a low-body bus according to claim 1, further comprising a pair of strut bars, each strut bar having one end connected to a corresponding one of said pair of frame members and the other end connected to the horizontal portion of a corresponding one of said pair of control arms.

5. The suspension system for a low-body bus according to claim 4, wherein each strut bar is connected to the corresponding one of said pair of frame members by a connecting means.

6. The suspension system for a low-body bus according to claim 5, wherein the connecting means is a bracket.

7. The suspension system for a low-body bus according to claim 5, further comprising a rubber washer interposed between the strut bar and the connecting means.

8. The suspension system for a low-body bus according to claim 1, further comprising a rubber washer interposed between the vertical portion of each control arm and said at least one shock absorber.

9. The suspension system for a low-body bus according to claim 1, wherein the horizontal portion of each control arm is longer than the vertical portion of the control arm.

10. The suspension system for a low-body bus according to claim 1, wherein each torsion bar is connected to a member extended from the corresponding one of said pair of frame members.

11. The suspension system for a low-body bus according to claim 1, wherein each torsion bar penetrates through a support extended from the the corresponding one of said pair of frame members.

* * * * *